United States Patent [19]

Godfrey et al.

[11] Patent Number: 6,111,859

[45] Date of Patent: Aug. 29, 2000

[54] DATA TRANSFER NETWORK ON A COMPUTER CHIP UTILIZING COMBINED BUS AND RING TOPOLOGIES

[75] Inventors: Gary M. Godfrey; J. Andrew Lambrecht, both of Austin; Alfred C. Hartmann, Round Rock, all of Tex.

[73] Assignee: Advanced Micro Devices, Inc., Sunnyvale, Calif.

[21] Appl. No.: 08/957,589

[22] Filed: Oct. 24, 1997

Related U.S. Application Data

[63] Continuation-in-part of application No. 08/783,433, Jan. 16, 1997, abandoned.

[51] Int. Cl.[7] .................................................. H04L 2/28
[52] U.S. Cl. ........................ 370/257; 370/364; 370/424; 370/489
[58] Field of Search ..................... 370/257, 258, 370/364, 424, 489; 709/251, 252, 253; 710/100

[56] References Cited

U.S. PATENT DOCUMENTS

| | | | |
|---|---|---|---|
| 4,293,948 | 10/1981 | Soderblom | 370/424 |
| 4,468,734 | 8/1984 | Lanier et al. . | |
| 4,797,882 | 1/1989 | Maxemchuk . | |
| 4,933,933 | 6/1990 | Dally et al. . | |
| 5,041,963 | 8/1991 | Ebersole et al. | 370/407 |
| 5,191,652 | 3/1993 | Dias et al. . | |
| 5,351,243 | 9/1994 | Kalkunte et al. | 370/475 |
| 5,383,191 | 1/1995 | Hobgood et al. . | |
| 5,394,389 | 2/1995 | Kremer . | |
| 5,485,458 | 1/1996 | Oprescu et al. | 370/409 |
| 5,500,852 | 3/1996 | Riley | 370/254 |
| 5,761,516 | 6/1998 | Rostoker et al. . | |
| 5,859,983 | 1/1999 | Heller et al. . | |
| 5,905,873 | 5/1999 | Hartmann et al. | 370/389 |
| 5,970,069 | 10/1999 | Kumar et al. | 370/402 |

OTHER PUBLICATIONS

Itano, et al "HIRB: A Hierarchical Ring Bus" University of Tsukuba, Japan, Proceedings of the Nineteenth Annual Hawaii International Conference on System Sciences, 1986, pp. 206–213.

Kim et al., "A Relational Dataflow Database Machine Based on Heirarchical Ring Network," Korea Advanced Institute of Technology, Proceedings of the International Conference on Fifth Generation Computer Systems, 2984, pp. 489–496.

Su, et al., "Adaptive Fault–Tolerant Deadlock–Free Routing of the Slotted Ring Multiprocessor," IEEE Transactions on Computers, vol. 45, No. 6, Jun. 1996, pp.666–683.

Gustavson, D.B., "Scalable Coherent Interface and Related Standards Projects," IEEE vol. 12, No. 1, pp. 10–22, Feb. 1992.

Cha, et al, "Simulated Behaviour of Large Scale SCI Rings and Tori," Depts. of Engineering and Computer Science, University of Cambridge, United Kingdom, pp. 1–21, Proceedings of 5th IEEE Symposium on Parallel and Distributed Processing, Dallas, Texas, Dec. 1993.

(List continued on next page.)

Primary Examiner—Hassan Kizou
Assistant Examiner—Mitchell Slavitt
Attorney, Agent, or Firm—Conley, Rose & Tayon P.C.; Jeffrey C. Hood; Louis H. Iselin

[57] ABSTRACT

A computer chip includes a data transfer network. The data transfer network comprises a backbone bus, a plurality of communication ports and a plurality of devices or modules each coupled to the backbone bus. Each of the devices includes or is coupled to one or more communication ports. Some of communication ports are operable to transmit and receive data on the backbone bus. Furthermore, the communication ports are interconnected in a ring topology forming a circular bus or a semi-circular bus. A subset of the communication ports may transmit and receive data on the circular bus or semi-circular bus. For the semi-circular bus, the communication ports are not coupled to form a complete ring topology. The communication ports may be operable to communicate with each other over the backbone bus and/or the circular bus. Each of the communication ports includes backbone bus interface logic, circular bus interface logic, one or more data transfer buffers and/or control logic. The communication ports are preferably able to transfer communications between the backbone bus, the circular bus and/or the modules.

19 Claims, 7 Drawing Sheets

OTHER PUBLICATIONS

Franklin, et al, "ARB: A Hardware Mechanism for Dynamic Reordering of Memory References," IEEE Transactions on Computers, vol. 45, No. 5, May 1996, pp. 552–571.

Barroso, et al, "Performance Evaluation of the Slotted Ring Multiprocessor," IEEE Transactions on Computers, vol. 44, No. 7, July 1995, pp. 878–890.

Bhuyan, et al, "Approximate Analysis of Single and Multiple Ring Networks," IEEE Transactions on Computers, vol. 38, No. 7, Jul. 1989, pp. 1027–1040.

Arden, et al, "Analysis of Chordal Ring Network," IEEE Transactions on Computers, Vo. C–30, No. 4, Apr. 1981, pp. 291–301.

Kubiatowicz et al, "The Alweife CMMU: Addressing the Multiprocessor Communications Gap," Extended Abstract for Hot Chips '94, 1994, pp. 1–3.

Kubiatowicz et al, "The Anatomy of a Message in the Alewife Multiprocessor," Proceedings of the International Conference on Supercomputing (ICS) 1993, pp. 195–206, Jul. 1993.

DATA TRANSFER NETWORK ON A COMPUTER CHIP UTILIZING COMBINED BUS AND RING TOPOLOGIES

CONTINUATION DATA

This is a continuation-in-part of application Ser. No. 08/783,433, entitled "Communication Traffic Circle System and Method for Performing Packet Conversion and Routing Between Different Packet Formats" (matter 764), by Al Hartmann, filed Jan. 16, 1997, now abandoned.

FIELD OF THE INVENTION

The present invention relates to computer chip architectures, and more particularly to an on-chip data transfer network which includes both a traffic circle architecture and a bus architecture for improved information routing between multiple on-chip modules.

DESCRIPTION OF THE RELATED ART

Computer systems have traditionally comprised a system unit or housing which comprises a plurality of electrical components comprising the computer system. A computer system typically includes a motherboard which is configured to hold the microprocessor and memory and the one or more busses used in the computer system. The motherboard typically comprises a plurality of computer chips or electrical components including intelligent peripheral devices, bus controllers, processors, bus bridges, etc.

More recently, computer systems are evolving toward an integration of functions into a handful of computer chips. This coincides with the ability of chip makers to place an increasingly large number of transistors on a single chip. For example, currently chip manufacturers are able to place up to ten million transistors on a single integrated circuit or monolithic substrate. It is anticipated that within several years chip makers will be able to place one billion transistors on a single chip. Thus, computer systems are evolving toward comprising a handful of computer chips, where each computer chip comprises a plurality of functions. As a result, new architectures are necessary to take advantage of this increased integration. Therefore, an improved system is desired for information transfer between a plurality of different functions or modules on a single computer chip.

SUMMARY OF THE INVENTION

The present invention comprises a computer chip including a data transfer network. The data transfer network comprises a backbone bus, a plurality of communication ports coupled to the backbone bus, and a plurality of devices or modules coupled to the backbone bus, wherein each of the devices includes one or more communication ports. In another embodiment, the communication ports are included in the devices or modules. At least a subset of the plurality of communication ports are operable to transmit and receive data on the backbone bus. Furthermore, the plurality of communication ports are further interconnected in a ring topology forming a circular bus or a semi-circular bus, wherein at least a subset of the plurality of communication ports are operable to transmit and receive data on the circular bus or semi-circular bus. The plurality of modules are operable to communicate with each other through the communication ports.

The plurality of communication ports preferably comprises a first plurality of communication ports coupled to a first side of the backbone bus, and a second plurality of communication ports coupled to a second side of the backbone bus. The first plurality of communication ports are directly electrically coupled forming a first portion of the circular bus, and the second plurality of communication ports are directly electrically coupled forming a second portion of the circular bus. The first and second pluralities of communication ports each include a first communication port and a last communication port. The first communication port of the first plurality of communication ports is preferably coupled to the first communication port of the second plurality of communication ports, and the last communication port of the first plurality of communication ports is preferably coupled to the last communication port of the second plurality of communication ports, thereby forming a circular bus between the communication ports. In an embodiment with a semi-circular bus, the last communication port of the first plurality of communication ports is not coupled to the last communication port of the second plurality of communication ports.

One or more of each plurality of communication ports coupled to the backbone bus are operable to communicate over the backbone bus to one or more of the other plurality of communication ports coupled to the backbone bus. Additionally, one or more of each plurality of communication ports coupled to the backbone bus are operable to communicate over the circular bus to one or more of the other plurality of communication ports coupled to the backbone bus. One or more communication ports coupled to the same side of the backbone bus may communicate over the backbone bus and/or the circular bus.

Each of the communication ports includes backbone bus interface logic coupled to the backbone bus, circular bus interface logic coupled to the circular bus, and/or one or more data transfer buffers and control logic. At least a first portion of the one or more data transfer buffers is coupled to the circular bus interface logic, and the first portion of the one or more data transfer buffers is configurable to communicate information between the coupled module and the circular bus. At least a second portion of the one or more data transfer buffers is coupled to the backbone bus interface logic, and the second portion of the one or more data transfer buffers is configurable to communicate information between the module and the backbone bus. One or more of the first portion and the second portion of the one or more data transfer buffers is configurable to communicate information between the backbone bus and the circular bus.

BRIEF DESCRIPTION OF THE DRAWINGS

A better understanding of the present invention can be obtained when the following detailed description of the preferred embodiment is considered in conjunction with the following drawings, in which.

Figure 1:
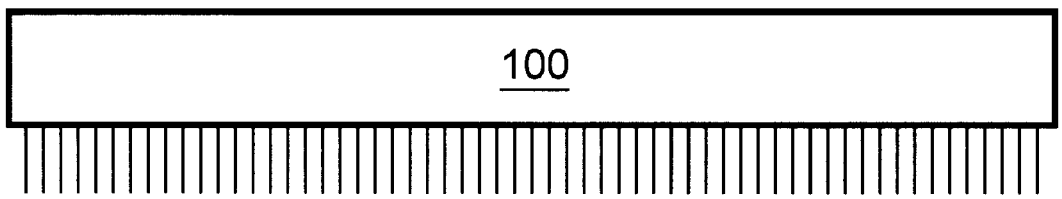
FIG. 1 illustrates a computer chip comprising an on-chip data transfer network according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF THE EMBODIMENTS

The present invention comprises an on-chip data transfer network which includes a traffic circle architecture and a bus architecture for improved information routing between multiple on-chip modules.

FIG. 1—Computer Chip

Referring now to FIG. 1, a computer chip 100 is shown from a side view. Computer chip 100 preferably comprises a monolithic silicon substrate comprising a plurality of transistors, according to the present invention. The computer chip may also use gallium arsenide (GaAs) or another suitable semiconductor material. Although shown as a ceramic socket mount pin grid array (PGA) package, the computer chip 100 may be packaged in any of various ways, including as a surface mount, socket mount, or insertion/socket mount. Materials used in the packaging of computer chip 100 may include ceramic packages, leadless chip carrier packages (LCC), glass-sealed packages, or plastic packages. Actual type of chip package for computer chip 100 may include, ceramic quad flatpack (CQFP), PGA, ceramic dual in-line package (C-DIP), LCC socket or surface mount, ceramic dual in-line package (CERDIP), ceramic quadpack (CERQUAD), small outline package gull wing (SOP), small outline package J-lead (SOJ), thin small outline package (TSOP) etc. and may have any of various types of connectivity including pin grid array (PGA), ball grid array (BGA), direct chip attach (DCA), metal bands or pins etc. Also usable is the controlled collapse chip connection (C4) method, commonly known as the "flip chip" method.

Computer chip 100 preferably utilizes a generic method for interconnecting multiple module types on a single computer chip 100 using intelligent buffering and a universal port design. Connecting each module to a communications pathway with a full duplex, general purpose communications port allows for heterogeneous and homogeneous module types to form a networked system on a single computer chip. The present invention allows "system on a chip" producers to integrate module designs from different sources or module core vendors. This promotes integration of "best of breed" cores from an evolving industry of "virtual component" suppliers. Further details of the components of the computer chip will be given in the descriptions of FIGS. 2–6.

Figure 2A:
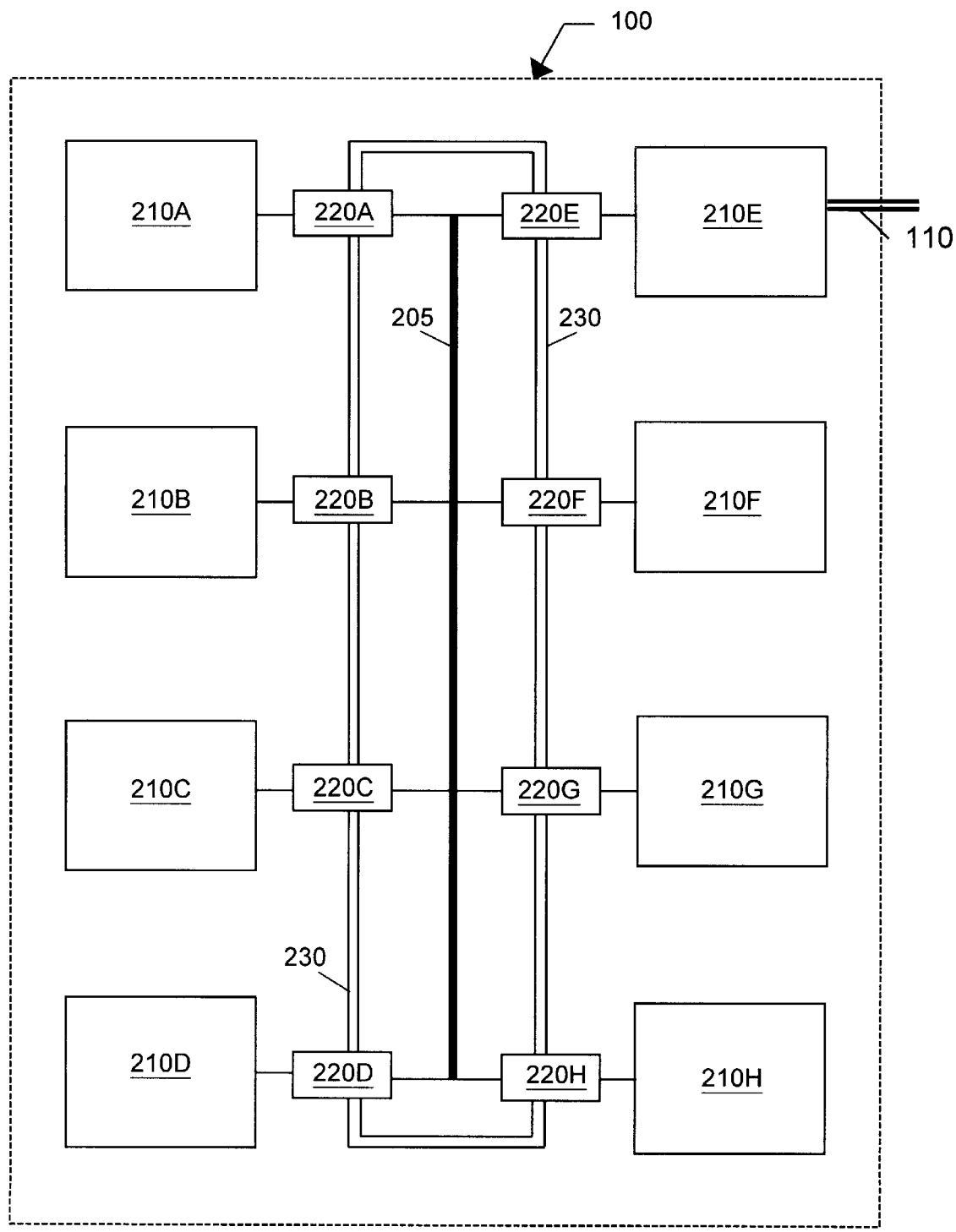
FIG. 2A illustrates an embodiment of the on-chip data transfer network shown in FIG. 1 according to the present invention.

FIG. 2A—On-Chip Data Transfer Network

Referring now to FIG. 2A, an embodiment is shown of computer chip 100 with an on-chip data transfer network for interconnecting a plurality of devices or modules 210A–210H linked by a plurality of communication ports to 220A–220H by single computer chip 100 in an on-chip data transfer network. When a reference is made to module 210 or communication port 220, that reference may refer to any of the modules 210A–210H or communication ports 220A–220H, respectively. The components of the network preferably include a backbone bus 205 with the plurality of communication ports 220A–220H coupled to the backbone bus 205, as well as a circular bus 230 with the plurality communication ports 220A–220H also coupled to the circular bus 230. At least a subset of the plurality of communication ports 220 is operable to transmit and receive data on either the backbone bus 205 and/or the circular bus 230. Each of the plurality of modules 210 is coupled to at least one of the plurality of communication ports 220. The plurality of modules 210 are configurable to communicate with each other through the communication ports 220. Modules 210 preferably perform operations, like a processor or an I/O controller, or storage like a memory, or a hybrid task, like a task specific hybrid (ASIC) or a task general hybrid.

Starting on the left side of FIG. 2A, moving top to bottom, modules 210A–210D are respectively coupled to the backbone bus 205 and the circular bus 230 via communication ports 220A–220D. On the right side of the figure modules 210E–210H are respectively coupled to the backbone bus 205 and the circular bus 230 via communication ports 220E–220H. Communication port 220A is electrically coupled to communication port 220E by circular bus 230, and likewise, communication port 220D is electrically coupled to port 220H by circular bus 230. Each of the plurality of communication ports 220A–220H are electrically coupled to the backbone bus 205.

One embodiment of computer chip 100 includes communication ports 220 divided into a first plurality of communication ports 220A–220D coupled to a first side of the backbone bus 205, and a second plurality of communication ports 220E–220H coupled to a second side of the backbone bus 205. The first plurality of communication ports 220A–220D are electrically coupled forming a first portion of the circular bus 230, and the second plurality of communication ports 220E–220H are electrically coupled forming a second portion of circular bus 230. The first plurality of communication ports 220A–220D includes a first communication port 220A and a last communication port 220D. The second plurality of communication port 220E–220H also includes a first communication port 220E and a last communication port 220H. The first communication port 220A of the first plurality of communication ports 220A–220D is coupled to the first communication port 220E of the second plurality of communication ports 220E–220H. The last communication port 220D of the first plurality of communication ports 220A–220D is coupled to the last communication port 220H of the second plurality of communication ports 220E–220H thereby forming circular bus 230 between the first and second pluralities of communication ports 220A–220H.

Although FIG. 2A shows eight communication ports electrically coupled for information transmission on a circular bus 230, one skilled in the art could add or subtract from that number as desired. Additionally, FIG. 2A shows each module 210 coupled to the circular bus 230 and the backbone bus 205 by only one communication port 220, one skilled in the art might also choose to connect a particular module 210 to more than one point on backbone bus 205 and/or more than one place on circular bus 230. For each coupling of objects or means, the coupling could be electrical, optical or mechanical as desired.

In the configuration shown in FIG. 2A the first plurality of communication ports 220A–220D coupled to the first side of the backbone bus 205 are operable to communicate over the backbone bus 205 to one or more of either the first plurality of communication ports 220A–220D or the second plurality of communication ports 220E–220H coupled to the second side of the backbone bus 205. Likewise, one or more of the second plurality communication ports 220E–220H coupled to the second side of the backbone bus 205 are operable to communicate over the backbone bus 205 to one or more of the first plurality of communication ports 220A–220D coupled to the first side of the backbone bus 205.

One or more of the first plurality of communication ports 220A–220D coupled to the first side of the backbone bus 205 are also operable to communicate over the circular bus 230 to one or more of the second plurality of communication ports 220E–220H coupled to the second side of the backbone bus 205. Likewise, one or more of the second plurality of communication ports 220E–220H coupled to the second side of the backbone bus 205 are operable to communicate over the circular bus 230 to one or more of the first plurality of communication ports 220E–220H coupled to the first side of the backbone bus 205. Each of the first plurality communication ports 220A–220D and the second plurality of communication ports 220E–220H are preferably operable to selectively communicate over the backbone bus 205 and/or the circular bus 230.

The data transfer network of computer chip 100 is operable in either a first mode or a second mode. Each of the first plurality of communication ports 220A–220D and the second plurality of communication ports 220E–220H may communicate in the first mode using only the backbone bus or a second mode using only the circular bus. One or more of the backbone bus 205 and the circular bus 230 may include addressing and/or control lines (not shown). Note also that module 210E is configured to communicate off-chip to any external device configured to accept input via lines 110. Any or various other modules 210 may also be configured in a similar manner to module 210E; that is, other modules 210 may also use lines similar in function to lines 110 for communications with devices external to chip 100.

Figure 2B:
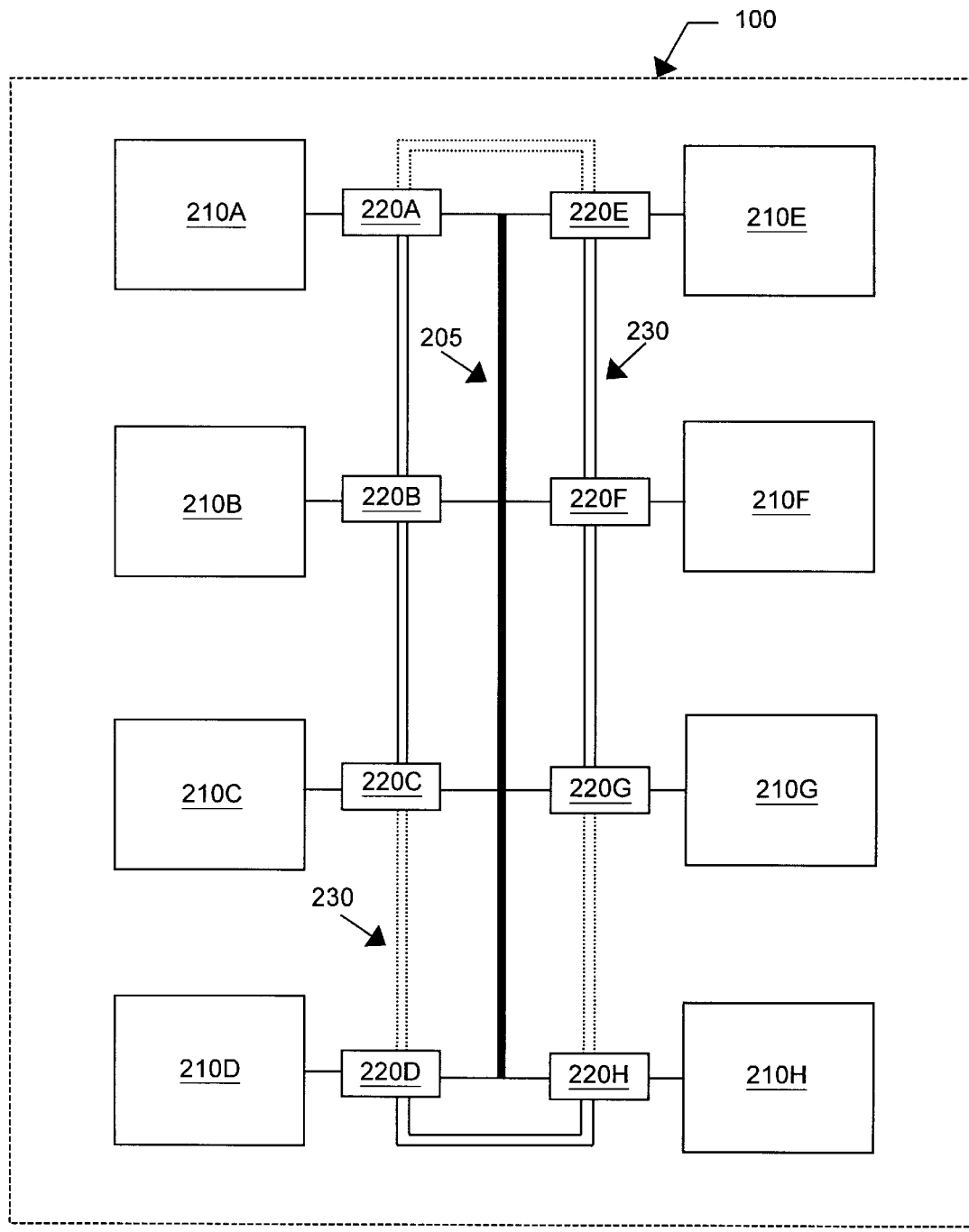
FIG. 2B illustrates an embodiment of the on-chip network shown in FIG. 2A configured according to the present invention.

FIG. 2B—Multiple Ring Groupings

Referring now to FIG. 2B, another embodiment of computer chip 100 with an on-chip data transfer network is shown. In this embodiment communication ports 220A–220C are configured in a first ring topology, communication ports 220D and 220H are configured in a second ring topology, and communication ports 220E–220G are configured in a third ring topology. While the couplings between communication ports 220A and 220E, communication ports 220C and 220D, and communication ports 220G and 220H are present, the modules 210 and their respective communication ports 220 are now configured to form three isolated rings. Communication between members of each ring preferably occurs over their respective portions of circular bus 230, while communications between the three rings will preferably occur over backbone bus 205.

While FIG. 2B shows three rings in a particular configuration, other configurations are possible. For example, communication ports 220A–220D could all be in one ring while communication ports 220E–220H could all be in a second ring. Connections between communication ports 220A and 220E and also between communication ports 220D and 220H would still be present, they would simply not be utilized in this configuration.

Figure 3:
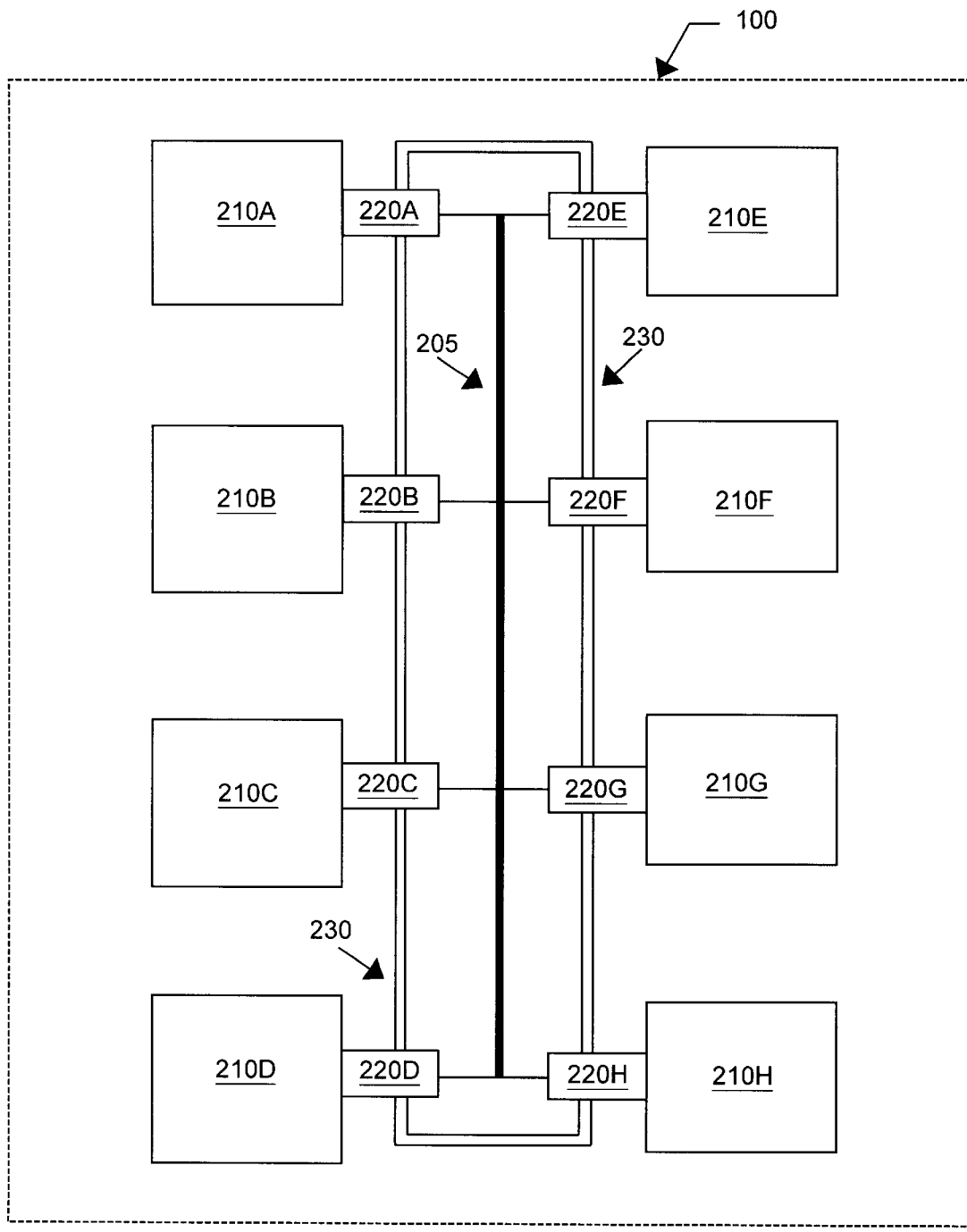
FIG. 3 illustrates another embodiment of the on-chip data transfer network shown in FIG. 1 according to the present invention.

FIG. 3—Data Transfer Network Between Modules

Referring now to FIG. 3, another embodiment is shown of computer chip 100 with an on-chip data transfer network. In this embodiment communication ports 220 and modules 210 are either directly connected or completely integrated as a single unit. Otherwise, the details of FIG. 3 are similar to those shown in FIG. 2A with possible configurations similar to those shown and discussed with FIG. 2B. Identical numbers and designations are used in FIG. 3 as were used in FIG. 2A.

Figure 4:
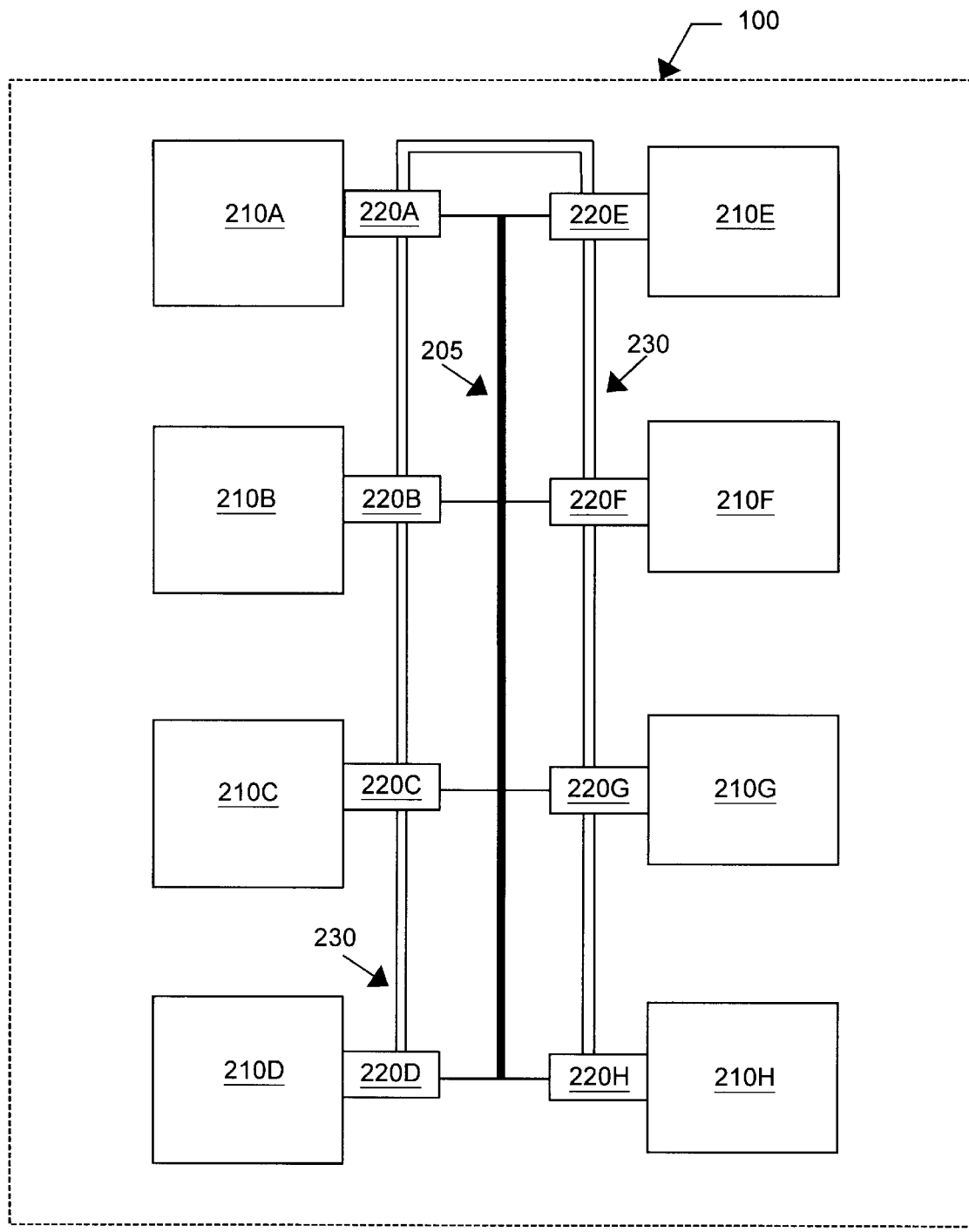
FIG. 4 illustrates an embodiment of the on-chip network shown in FIG. 3 configured as a semi-circular bus according to the present invention.

FIG. 4—Semi-circular Bus

Referring now to FIG. 4, another embodiment is shown of computer chip 100 with an on-chip data transfer network. In this embodiment, circular bus 230 is a semi-circular bus. In other words, circular bus 230 is an incomplete ring when compared to FIG. 2A.

Starting on the left side of FIG. 4, moving top to bottom, modules 210A–210D are respectively coupled to the backbone bus 205 and the circular bus 230 via communication ports 220A–220D. Communication port 220A is electrically coupled to communication port 220E by circular bus 230.

On the right side of the figure modules 210E–210H are respectively coupled to the backbone bus 205 and the circular bus 230 via communication ports 220E–220H. Each of the plurality of communication ports 220A–220H are also electrically coupled to the backbone bus 205.

This embodiment of computer chip 100 includes communication ports 220 divided into a first plurality of communication ports 220A–220D coupled to a first side of the backbone bus 205, and a second plurality of communication ports 220E–220H coupled to a second side of the backbone bus 205. The first plurality of communication ports 220A–220D are directly electrically coupled forming a first portion of the circular bus 230, and the second plurality of communication ports 220E–220H are electrically coupled forming a second portion of circular bus 230. The first plurality of communication ports 220A–220D includes a first communication port 220A and a last communication port 220D. The second plurality of communication ports 220E–220H also includes a first communication port 220E and a last communication port 220H. The first communication port 220A of the first plurality of communication ports 220A–220D is coupled to the first communication port 220E of the second plurality of communication ports 220E–220H. Unlike FIG. 2A, the last communication port 220D of the first plurality of communication ports 220A–220D is not coupled to the last communication port 220H of the second plurality of communication ports 220E–220H. Thus only a semi-circular version of circular bus 230 is formed between the first and second pluralities of communication ports 220A–220H.

Although FIG. 4 shows eight communication ports electrically coupled for information transmission on a circular bus 230, one skilled in the art could add or subtract from that number. Also, FIG. 4 shows each module 210 coupled to the circular bus 230 and the backbone bus 205 by only one communication port 220, one skilled in the art might also choose to connect a particular module 210 to more than one point on backbone bus 205 and/or more than one place on circular bus 230.

In the configuration shown in FIG. 2A the first plurality of communication ports 220A–220D coupled to the first side of the backbone bus 205 were operable to communicate over the backbone bus 205 to one or more of either the first plurality of communication ports 220A–220D or the second plurality of communication ports 220E–220H coupled to the second side of the backbone bus 205. Likewise, one or more of the second plurality communication ports 220E–220H coupled to the second side of the backbone bus 205 are operable to communicate over the backbone bus 205 to one or more of the first plurality of communication ports 220A–220D coupled to the first side of the backbone bus 205.

One or more of the first plurality of communication ports 220A–220D coupled to the first side of the backbone bus 205 are also operable to communicate over the circular bus 230 to one or more of the second plurality of communication ports 220E–220H coupled to the second side of the backbone bus 205. Likewise, one or more of the second plurality of communication ports 220E–220H coupled to the second side of the backbone bus 205 are operable to communicate over the circular bus 230 to one or more of the first plurality of communication ports 220E–220H coupled to the first side of the backbone bus 205. Each of the first plurality communication ports 220A–220D and the second plurality of communication ports 220E–220H are preferably operable to selectively communicate over the backbone bus 205 and/or the circular bus 230.

The data transfer network of computer chip 100 is operable in either a first mode or a second mode. Each of the first plurality of communication ports 220A–220D and the second plurality of communication ports 220E–220H may communicate in the first mode using only the backbone bus or a second mode using only the circular bus. One or more of the backbone bus 205 and the circular bus 230 may include addressing and/or control lines (not shown).

Figure 5:
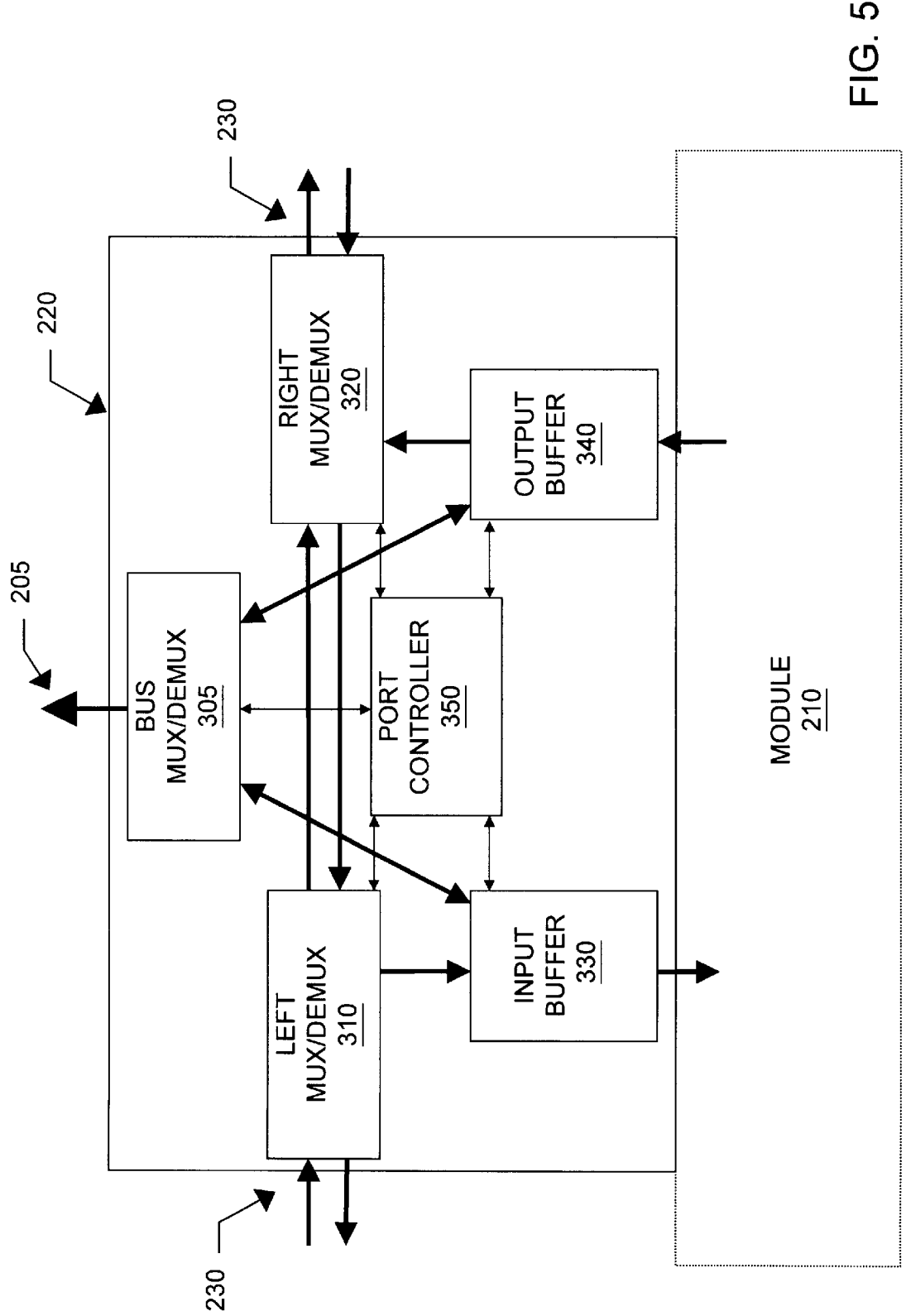
FIG. 5 illustrates an embodiment of a communication port according to one embodiment of the present invention.

FIG. 5—Communication Port

Referring now to FIG. 5, an embodiment of communication port 220 is shown along with the couplings between communication port 220, backbone bus 205 and circular bus 230. Although communication port 220 is shown as a separate item from module 210, in another embodiment communication port 220 may be incorporated into module 210. Preferably included as components of communication port 220 are bus multiplexer(MUX)/demultiplexer (DEMUX) 305 coupled to the backbone bus 205, a pair of MUX/DEMUXs, left MUX/DEMUX 310 and right MUX/DEMUX 320, each coupled to circular bus 230, input buffer 330, output buffer 340 and port controller 350. Left MUX/DEMUX 310 and right MUX/DEMUX 320 are coupled together. Left MUX/DEMUX 310 is further coupled to input buffer 330 which is further coupled to module 210. Right MUX/DEMUX 320 is further coupled to output buffer 340 which is also coupled to module 210.

Operations of communication port 220 are preferably controlled by the port controller 350 which preferably includes backbone bus interface logic (not shown) and circular bus interface logic (not shown). All included components of port controller 350 may also be comprised in module 210 or a separate part of computer chip 100. In the preferred embodiment, port controller 350, including backbone bus interface logic and circular bus interface logic, is coupled to the backbone bus 205 and the circular bus 230. As shown in FIG. 5 the port controller 350 issues communications and/or commands to bus MUX/DEMUX 305, left MUX/DEMUX 310, right MUX/DEMUX 320, input buffer 330 and output buffer 340. In addition bus MUX/DEMUX 305 is coupled to input buffer 330 and output buffer 340. Controller 350 is preferably operable to control transfer of data to and from backbone bus 205 and module 210 by way of bus MUX/DEMUX 305 via input buffer 330 and output buffer 340. Port control 350 is also preferably operable to control information transfer between circular bus 230 and module 210 by regulating transfer of data from module 210 to output buffer 340 through the right MUX/DEMUX 320 and onto circular bus 230. In this embodiment port controller 350 controls transfer of data from the backbone bus 205 to circular bus 230 through transfer of data from bus MUX/DEMUX 305 to output buffer 340 through right MUX/DEMUX 320 and then onto circular bus 230. Optionally, right MUX/DEMUX 320 can routed data through left MUX/DEMUX 310 before it is transferred to circular bus 230.

Input buffer 330 and output buffer 340 may also be comprised as part of module 210. Bus MUX/DEMUX 305, left MUX/DEMUX 310, and right MUX/DEMUX 320, input buffer 330 and output buffer 340 may interchangeably be data transfer buffers and/or multiplexers and/or demultiplexers. Each communication port 220 preferably includes one or more data transfer buffers. At least a first portion of the one or more data transfer buffers is coupled to the circular bus interface logic that is shown as part of port controller 350. The first portion of the one or more data transfer buffers is configurable to communicate information between the module 210 and the circular bus 230. A second portion of the one or more data transfer buffers is coupled to the backbone bus interface logic shown in FIG. 5 as included in port controller 350. The second portion of the one or more data transfer buffers is configurable configurable to communicate information between the module 210 and the backbone bus 205. Furthermore, one or more of the first portion and/or the second portion of the transfer buffers are configurable to communicate information between the backbone bus 205 and the circular bus 230.

In another embodiment computer chip 100 includes an additional plurality of buffers with each of the buffers coupled between their respective communication port 220 and the backbone bus 205. Computer chip 100 may also comprise a plurality of buffers coupled between communication port 220 and circular bus 230. These pluralities of buffers are operable for buffering data between a respective communication port 220 and/or the backbone bus 205 and/or the circular bus 230.

Figure 6:
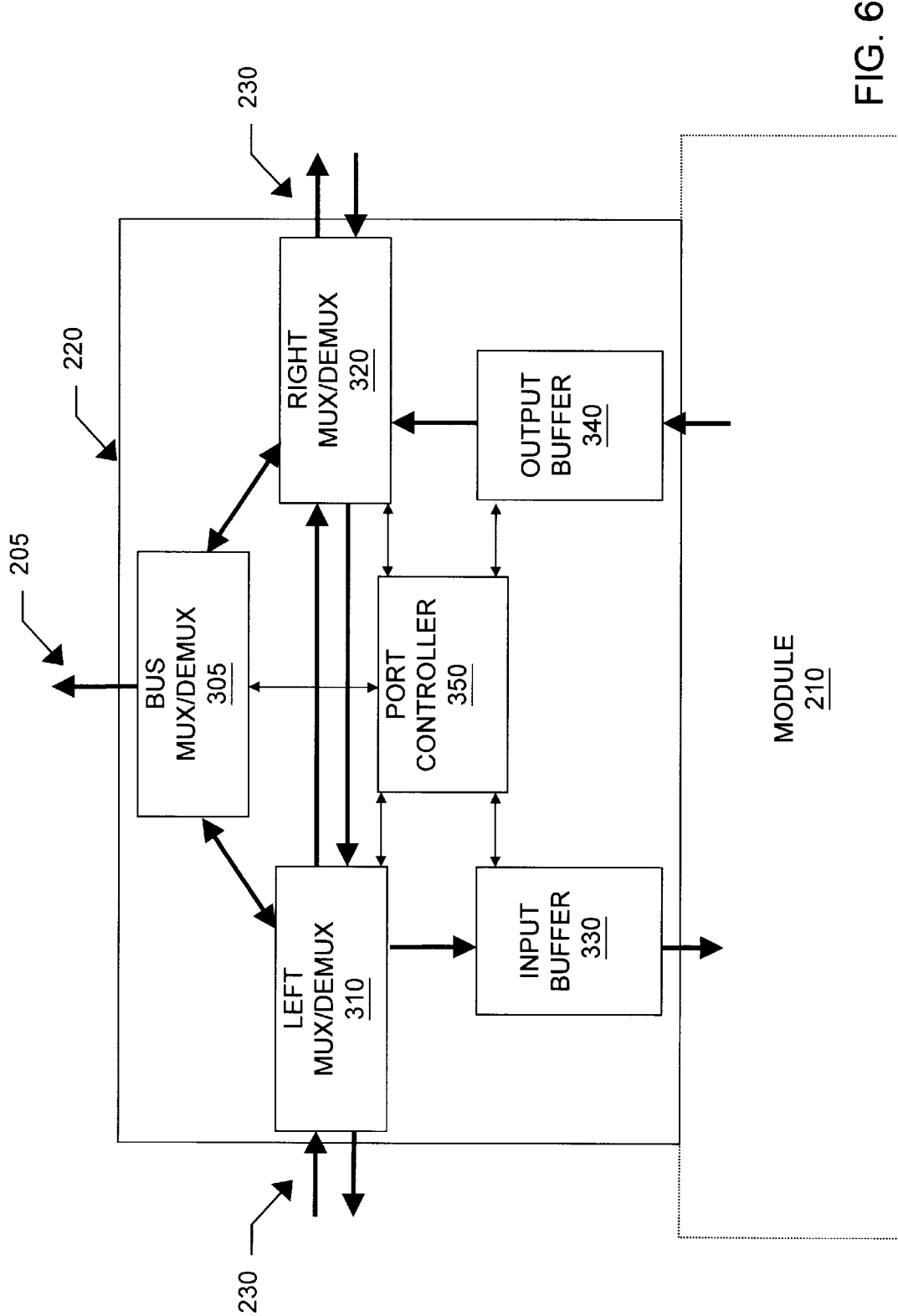
FIG. 6 illustrates an embodiment of a communication port according to one embodiment of the present invention.

FIG. 6—Communications Port

Referring now to FIG. 6, an embodiment is shown of communications port 220 wherein data transfers between the backbone bus 205, the circular bus 230 and the module 210 are made from MUX/DEMUX 305 directly to and from left MUX/DEMUX 310 and/or right MUX/DEMUX 320. In this embodiment bus MUX/DEMUX 305 is not connecting to input buffer 330 or output buffer 340. Otherwise the components, operations and designations in FIG. 6 are the same as FIG. 5.

Conclusion

Although the system of the present invention has been described in connection with the preferred and various embodiments, it is not intended to be limited to the specific form set forth herein, but on the contrary, it is intended to cover such alternatives, modifications, and equivalents, as can be reasonably included within the spirit and scope of the invention as defined by the appended claims.

In the claims:

1. A computer chip comprising a data transfer network, the data transfer network comprising:

a backbone bus;

a plurality of communication ports coupled to the backbone bus, wherein at least a subset of the plurality of communication ports are operable to transmit and receive data on the backbone bus;

wherein the plurality of communication ports are further interconnected in a ring topology forming a circular bus, wherein at least a subset of the plurality of communication ports are operable to transmit and receive data on the circular bus;

wherein said plurality of communication ports comprises a first plurality of communication ports coupled to a first side of said backbone bus, and a second plurality of communication ports coupled to a second side of said backbone bus;

wherein said first plurality of communication ports are directly electrically coupled forming a first portion of said circular bus, and wherein said second plurality of communication ports are directly electrically coupled forming a second portion of said circular bus;

wherein said first plurality of communication ports includes a first communication port and a last communication port, and wherein said second plurality of communication ports includes a first communication port and a last communication port;

wherein said first communication port of said first plurality of communication ports is coupled to said first communication port of said second plurality of communication ports, and wherein said last communication port of said first plurality of communication ports is coupled to said last communication port of said second plurality of communication ports, thereby forming a circular bus between said communication ports;

a plurality of modules, wherein each of said plurality of modules is coupled to at least one of said plurality of communication ports, wherein said plurality of modules are operable to communicate with each other through said communication ports.

2. The computer chip of claim 1, wherein one or more of said first plurality of communication ports coupled to said first side of said backbone bus are operable to communicate over said backbone bus to one or more of said second plurality of communication ports coupled to said second side of said backbone bus;

wherein one or more of said first plurality of communication ports coupled to said first side of said backbone bus are operable to communicate over said circular bus to one or more of said second plurality of communication ports coupled to said second side of said backbone bus.

3. The computer chip of claim 2, wherein each of said first plurality of communication ports and said second plurality of communication ports are operable to selectively communicate over either said backbone bus or said circular bus.

4. The computer chip of claim 1, wherein said data transfer network is operable in a first mode wherein each of said first plurality of communication ports and said second plurality of communication ports communicate only using said backbone bus, and wherein said data transfer network is operable in a second mode wherein each of said first plurality of communication ports and said second plurality of communication ports communicate only using said circular bus.

5. The computer chip of claim 1, wherein each of said communication ports comprises:

backbone bus interface logic coupled to said backbone bus;

circular bus interface logic coupled to said circular bus;

one or more data transfer buffers, wherein at least a first portion of said one or more data transfer buffers is coupled to said circular bus interface logic, wherein said first portion of said one or more data transfer buffers is configurable to communicate information between said module and said circular bus; wherein at least a second portion of said one or more data transfer buffers is coupled to said backbone bus interface logic, wherein said second portion of said one or more data transfer buffers is configurable to communicate information between said module and said backbone bus, wherein one or more of said first portion and said second portion of said one or more data transfer buffers is configurable to communicate information between said backbone bus and said circular bus.

6. The computer chip of claim 1, further comprising:

a plurality of buffers, wherein each of the plurality of buffers is coupled between a respective communication port and the backbone bus;

wherein the plurality of buffers are operable for buffering data between a respective communication port and the backbone bus.

7. The computer chip of claim 1, further comprising:

a plurality of buffers, wherein each of the plurality of buffers is coupled between a respective communication port and the circular bus;

wherein the plurality of buffers are operable for buffering data between a respective communication port and the circular bus.

8. The computer chip of claim 1, wherein each of said modules performs one or more operations, wherein said operations comprise a processor, a memory, an I/O controller, a task-specific hybrid, and a task-general hybrid.

9. The computer chip of claim 1, wherein one or more of said backbone bus and said circular data bus include addressing and control lines.

10. The computer chip of claim 1, wherein the circular bus is configured in a multiple ring topology.

11. A computer chip comprising a data transfer network, the computer chip comprising:

a backbone bus;

a plurality of communication ports coupled to the backbone bus, wherein at least a subset of the plurality of communication ports are operable to transmit and receive data on the backbone bus;

wherein the plurality of communication ports are further interconnected in a half-ring topology forming a semi-circular bus, wherein at least a subset of the plurality of communication ports are operable to transmit and receive data on the semi-circular bus;

wherein said plurality of communication ports comprises a first plurality of communication ports coupled to a first side of said backbone bus, and a second plurality of communication ports coupled to a second side of said backbone bus;

wherein said first plurality of communication ports are electrically coupled forming a first portion of said circular bus, and wherein said second plurality of communication ports are directly electrically coupled forming a second portion of said circular bus;

wherein said first plurality of communication ports includes a first communication port and a last communication port, and wherein said second plurality of communication ports includes a first communication port and a last communication port;

wherein said first communication port of said first plurality of communication ports is coupled to said first communication port of said second plurality of communication ports, thereby forming a semi-circular bus between said communication ports;

a plurality of modules, wherein each of said plurality of modules is coupled to at least one of said plurality of communication ports, wherein said plurality of modules are operable to communicate with each other through said communication ports.

12. The computer chip of claim 11, wherein said last communication port of said first plurality of communication ports is not coupled to said last communication port of said second plurality of communication ports.

13. A computer chip comprising a data transfer network, the computer chip comprising:
  a backbone bus;
  a plurality of devices coupled to the backbone bus, wherein each of said devices includes one or more communication ports coupled to the backbone bus, wherein at least a subset of the plurality of communication ports are operable to transmit and receive data on the backbone bus;
  wherein the plurality of communication ports are further interconnected in a ring topology forming a circular bus, wherein at least a subset of the plurality of communication ports are operable to transmit and receive data on the circular bus;
  wherein said plurality of communication ports comprises a first plurality of communication ports coupled to a first side of said backbone bus, and a second plurality of communication ports coupled to a second side of said backbone bus;
  wherein said first plurality of communication ports are directly electrically coupled forming a first portion of said circular bus, and wherein said second plurality of communication ports are directly electrically coupled forming a second portion of said circular bus;
  wherein said first plurality of communication ports includes a first communication port and a last communication port, and wherein said second plurality of communication ports includes a first communication port and a last communication port;
  wherein said first communication port of said first plurality of communication ports is coupled to said first communication port of said second plurality of communication ports, and wherein said last communication port of said first plurality of communication ports is coupled to said last communication port of said second plurality of communication ports, thereby forming a circular bus between said communication ports;
  wherein said plurality of devices are operable to communicate with each other through said communication ports.

14. The computer chip of claim 13, further comprising:
  a plurality of buffers, wherein each of the first plurality of buffers is coupled between a respective communication port, the backbone bus and the circular bus;
  wherein each of the plurality of buffers is operable for buffering data between a respective communication port and either the backbone bus or the circular bus,
  wherein each of the plurality of buffers is operable for buffering data between the backbone bus and the circular bus.

15. The computer chip of claim 13, wherein the circular bus is configured in a multiple ring topology.

16. A computer chip comprising a data transfer network, the data transfer network comprising:
  a backbone bus;
  a plurality of communication ports coupled to the backbone bus, wherein at least a subset of the plurality of communication ports are operable to transmit and receive data on the backbone bus;
  wherein the plurality of communication ports are further interconnected in a ring topology forming a circular bus, wherein at least a subset of the plurality of communication ports are operable to transmit and receive data on the circular bus;
  a plurality of modules, wherein each of said plurality of modules is coupled to at least one of said plurality of communication ports, wherein said plurality of modules are operable to communicate with each other through said communication ports;
  wherein said data transfer network is operable in a first mode wherein each of a first plurality of communication ports and a second plurality of communication ports communicate only using said backbone bus, and wherein said data transfer network is operable in a second mode wherein each of said first plurality of communication ports and said second plurality of communication ports communicate only using said circular bus.

17. A computer chip comprising a data transfer network, the data transfer network comprising:
  a backbone bus;
  a plurality of communication ports coupled to the backbone bus, wherein at least a subset of the plurality of communication ports are operable to transmit and receive data on the backbone bus;
  wherein the plurality of communication ports are further interconnected in a ring topology forming a circular bus, wherein at least a subset of the plurality of communication ports are operable to transmit and receive data on the circular bus;
  a plurality of modules, wherein each of said plurality of modules is coupled to at least one of said plurality of communication ports, wherein said plurality of modules are operable to communicate with each other through said communication ports;
  wherein each of said communication ports comprises:
    backbone bus interface logic coupled to said backbone bus;
    circular bus interface logic coupled to said circular bus;
    one or more data transfer buffers, wherein at least a first portion of said one or more data transfer buffers is coupled to said circular bus interface logic, wherein said first portion of said one or more data transfer buffers is configurable to communicate information between said module and said circular bus; wherein at least a second portion of said one or more data transfer buffers is coupled to said backbone bus interface logic, wherein said second portion of said one or more data transfer buffers is configurable to communicate information between said module and said backbone bus, wherein one or more of said first portion and said second portion of said one or more data transfer buffers is configurable to communicate information between said backbone bus and said circular bus.

18. A computer chip comprising a data transfer network, the data transfer network comprising:
  a backbone bus;
  a plurality of communication ports coupled to the backbone bus, wherein at least a subset of the plurality of communication ports are operable to transmit and receive data on the backbone bus;
  wherein the plurality of communication ports are further interconnected in a ring topology forming a circular bus, wherein at least a subset of the plurality of communication ports are operable to transmit and receive data on the circular bus;
  a plurality of modules, wherein each of said plurality of modules is coupled to at least one of said plurality of communication ports, wherein said plurality of modules are operable to communicate with each other through said communication ports;

a plurality of buffers, wherein each of the plurality of buffers is coupled between a respective communication port and the backbone bus;

wherein the plurality of buffers are operable for buffering data between a respective communication port and the backbone bus.

19. A computer chip comprising a data transfer network, the data transfer network comprising:

a backbone bus;

a plurality of communication ports coupled to the backbone bus, wherein at least a subset of the plurality of communication ports are operable to transmit and receive data on the backbone bus;

wherein the plurality of communication ports are further interconnected in a ring topology forming a circular bus, wherein at least a subset of the plurality of communication ports are operable to transmit and receive data on the circular bus;

a plurality of modules, wherein each of said plurality of modules is coupled to at least one of said plurality of communication ports, wherein said plurality of modules are operable to communicate with each other through said communication ports;

a plurality of buffers, wherein each of the plurality of buffers is coupled between a respective communication port and the circular bus;

wherein the plurality of buffers are operable for buffering data between a respective communication port and the circular bus.

* * * * *